United States Patent

[11] 3,602,646

[72] Inventor Abraham A. Goldberg
Stamford, Conn.
[21] Appl. No. 798,083
[22] Filed Feb. 10, 1969
[45] Patented Aug. 31, 1971
[73] Assignee Columbia Broadcasting Systems, Inc.
New York, N.Y.

[54] CHARACTER CONTOUR EDGER
6 Claims, 1 Drawing Fig.

[52] U.S. Cl. .......... 178/5.4 R, 178/DIG. 34
[51] Int. Cl. .......... H04n 5/14
[50] Field of Search .......... 178/6, 5.8 R, 5.2 R, 5.4 R, DIG. 6, DIG. 34

[56] References Cited

UNITED STATES PATENTS 3,465,097 9/1969 Brabon et al. .......... 178/6

*Primary Examiner*—Robert L. Griffin
*Assistant Examiner*—George G. Stellar
*Attorney*—Brumbaugh, Graves, Donohue & Raymond

ABSTRACT: As described herein, electronically generated alphanumeric character waveforms are supplied to an image enhancer circuit which reproduces the waveforms together with detail signals occurring at the leading and trailing edges of the reproduced waveforms. The reproduced waveforms and the detail signals are aligned in time and thereafter supplied to a pair of keying circuits, respectively, which in response to the reproduced waveforms and the detail signals, supply predetermined potentials to a television channel with the result that the letter waveforms will be reproduced with predetermined color contours.

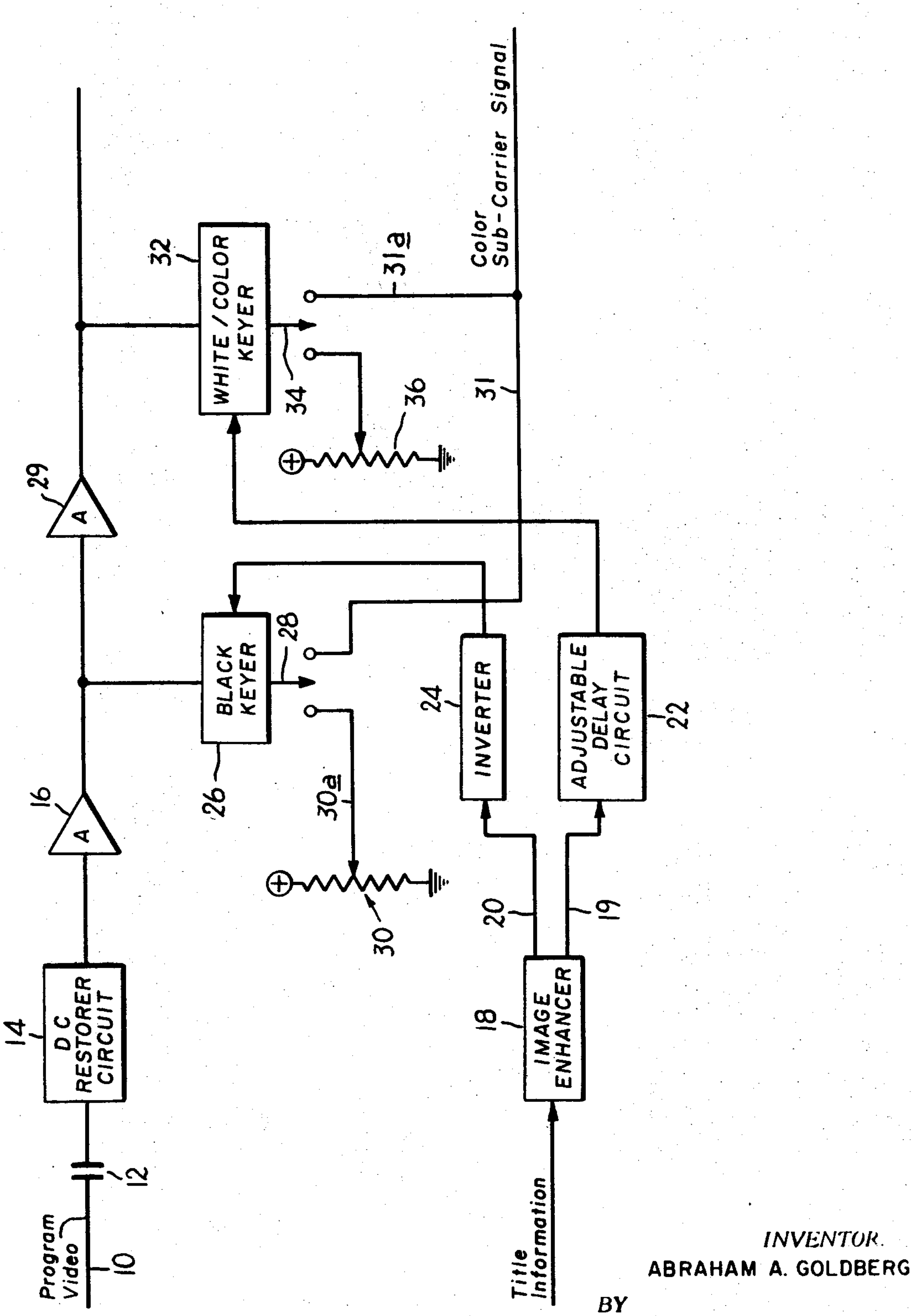
INVENTOR.
ABRAHAM A. GOLDBERG
BY
Brumbaugh, Graves, Donohue & Raymond
his ATTORNEYS

CHARACTER CONTOUR EDGER

BACKGROUND OF THE INVENTION

This invention relates to apparatus for supplying title information signals to a television channel and, more particularly, to apparatus for supplying title information signals with predetermined contour enhancement to a television channel.

In many instances, it is desirable in television broadcasting to insert title information into the program video. The title information may, for example, identify an individual or group of individuals, or may be utilized to report to the viewer unrelated events without interrupting the main program. Heretofore, the title information was generally reproduced as white alphanumeric characters on a gray background and was generally felt to be entirely satisfactory. This was true even where the title information was superimposed on a white background, such as for example, in the reporting of sporting events.

SUMMARY OF THE INVENTION

It is an object of the present invention to provide apparatus for enhancing the contours of title information in a predetermined color.

It is also an object of the present invention to provide apparatus for blanking out in a television channel the program video and, at the same time, introducing into said channel title information with predetermined contour enhancement.

These and other objects of the present invention are accomplished by developing detail signals from electronically generated title information signals and aligning the detail signals with the title information signals. To introduce the title information signals with predetermined contour enhancement into a television channel, the detail and the title information signals are supplied respectively to a pair of keying circuits which, in response to the signals, supply suitable predetermined signals to the channel with the result that the program video is blanked out and the title information with contour enhancement inserted into the television channel.

In a preferred embodiment of the invention, a first keyer circuit is provided to respond to the detail signals and supply to the television channel either a color subcarrier signal or a predetermined potential for the durations of the detail signals and a second keyer circuit is provided for supplying to the television channel either a predetermined potential or a color subcarrier signal for the durations of the title information signals.

BRIEF DESCRIPTION OF THE DRAWING

In the Drawing:

The FIGURE is a schematic block diagram of an illustrative television contour edger apparatus arranged according to the present invention.

DESCRIPTION OF THE PREFERRED EMBODIMENT

In the illustrative embodiment of a television contour edger apparatus arranged according to the present invention, as shown in the FIGURE, program video signals conducted in a channel 10 are supplied via a capacitor 12 to a DC restorer circuit 14. The DC restorer circuit inserts the appropriate black level into the program video signals, as is done in conventional television procedure. As will be understood in the art, a DC restorer circuit of either the peak rectifier type or the keyed clamp type may be utilized in the present invention. After DC restoration, the program video signals are amplified by an amplifier 16.

At the appropriate time relative to the program video signals, electronically generated title information signals, such as, for example, signals corresponding to alphanumeric characters, are supplied to an image enhancer circuit 18. Two types of image enhancer circuits which may be utilized successfully in the present invention are the CLD Models 527 and 530 image enhancer circuits manufactured by CBS laboratories, a Division of Columbia Broadcasting System, Inc. Because these units are commercially available, a detailed description thereof is unneccessary. It suffices that the units include a horizontal aperture correction circuit and a crispener circuit, each of which may be of conventional construction, and a vertical aperture correction circuit of the type disclosed in the pending U.S. Pat. application entitled "Vertical Aperture Correction Apparatus," Ser. No. 584,385, filed Oct. 5, 1966, (now U.S. Pat. No. 3,536,826,) and assigned to the assignee of the instant patent application. An image enhancer is described in an article entitled "Improved Signal Processing Techniques for Color Television Broadcasting" by R. H. McMann and A. A. Goldberg which appeared at page 221 of the March 1968 issue of the Journal of the SMPTE.

Generally, the image enhancer circuit 18 reproduces main signals at an output terminal 19 which correspond to the title information signals supplied to the input terminal of the circuit 18 and detail signals at an output terminal 20. Each detail signal includes negative pulses occurring at the leading and trailing edges of each reproduced main signal and is retarded in time, for example, 500 nanoseconds, with respect to the main signal. Also included in each detail signal are negative pulses which occur at the top and bottom edges of each reproduced main signal and which are similarly delayed in time with respect to the main signal. The detail signal represents a correction signal which compensates for the spread of information to and from a scanned picture element during successive scansions of the picture element.

To compensate for the retardation of the detail signals, the main signals are supplied to an adjustable delay circuit 22 which delays the main signals by a predetermined amount to coincidentally align in time the detail signals and the main signals. A typical adjustable delay circuit which has been used with success in the present invention is the Model 397 Allen delay line. As above noted, each detail signal produced by the image enhancer circuit 18 comprises negative pulses at the leading, trailing, top and bottom edges of its associated main signal. Accordingly, to invert the phase of the detail signals an inverter circuit 24 is provided. Again, the inverter 24 may be of conventional construction and, accordingly, need not be described herein.

From the inverter circuit 24 the detail signals are coupled to the input terminal of a black keyer circuit 26. Keyer circuits are disclosed in Chapter 16 of the book entitled "Television Engineering Handbok" by D. Fink, McGraw-Hill Book Co. (1957). The black keyer circuit 26 which may be of a conventional type, such as, for example, a Model 930 Grass Valley Insert Keyer, and accordingly operates as a gate, responds to the detail signals to close a conductive path between a contact 28 and the video channel 10 at the junction between the output terminal of an amplifier 16 and the input terminal of an amplifier 29. The type edging or contour enhancement to be implemented is controlled by actuating the contact 28 into engagement with either the center top **30*a* of a potentiometer 30 or with a conductor 31** carrying a color subcarrier signal with an adjustable phase and amplitude.

Where colorized edging is desired, the contact 28 is actuated into engagement with the conductor 31 and for the period of time the black keyer circuit is actuated by the detail signals, the color subcarrier signal is supplied to the video channel 10. As is understood, the hue and saturation of the reproduced colorized edges may be varied by varying the phase (with respect to a generated color burst) and amplitude of the color subcarrier signal supplied to the conductor 31 from s source (not shown). The setting of the potentiometer 30 determines the amount of black edging to be achieved. Specifically, when the keyer circuit 26 is driven into a conductive state by the detail signals and the contact 28 is actuated into engagement with the tap **30*a* of the potentiometer 30, the potential supplied through the keyer circuit from the potentiometer 30 will saturate the amplifier 29** to maintain the output thereof at ground (black edging) or a predetermined positive potential.

The output of the delay circuit 22 is coupled to the input terminal of a white/color keyer circuit 32. For the duration of each main signal, the keyer circuit 32 in response to the main signal will close a conductive path between the arm of a contact 34 and the video channel 10. Again, the white/color keyer circuit 32 may be of conventional construction and a particular model which has been used with success in the instant invention is the Model 930/931 Grass VAlley Insert Keyer. Depending upon the type coloration of the title information desired, the contact 34 may be actuated to couple either a potentiometer 36 to the channel 10 during conduction by the keyer circuit 32 or the color subcarrier signal which has an adjustable phase and amplitude and which is supplied on a branch conductor 31*a* of the conductor 31 to the channel 10 for the duration of the main signal.

Where colorized title information is desired, the contact 28 is set into engagement with the center tap 30*a* of the potentiometer 30, the potentiometer 30 is adjusted to a setting which will result in the amplifier 29 supplying a slightly positive or gray output signal and the switch 34 connected to the subcarrier signal conductor 31*a*. This will result in the reproduction of colorized title information with a gray contour. Where title information edged in black is desired, the contact 28 is connected to the center tap 30*a*, the potentiometer 30 is adjusted to a setting which will result in clamping the output of the amplifier 29 to ground and the contact 34 is coupled to the potentiometer 36 with the result that the output signal of the amplifier 29 has its potential raised to a white or highly positive level during the duration of the main signal and between the positive pulses composing the detail signal. To generate title information edged in a color, the contact 28 is connected to the color subcarrier conductor 31 and the contact 34 is coupled to the potentiometer 36. From the above, it may be realized that to achieve optimum contour enhancement, the detail signals and the main signals must be supplied concurrently to the keyer circuits 26 and 32, respectively.

In operation, program video signals are supplied in a channel 10 to the DC restorer circuit 14 which introduces the appropriate black level into the signals. Thereafter, the signals are amplified by the amplifiers 16 and 29 and supplied as output signals adapted for broadcasting. At appropriate times, electronically generated alphanumeric character signals are supplied to the image enhancer circuit 18. The circuit 18 develops reproductions of the input signals together with detail or correction signals comprising negative pulses occurring at the leading, trailing, top and bottom edges of the reproductions.

After the detail signals and the reproductions are aligned in time and the polarity of the detail signals inverted, the reproductions and the detail signals are supplied concurrently to the keying circuits 32 and 26, respectively. Depending on the setting of the switch 28 and in response to the detail signals, the circuit 26 couples either a variable potential from the potentiometer 30 or a color subcarrier signal to the input terminal of the amplifier 29. Depending upon the setting of the potentiometer 30, the output of the amplifier will be either clamped to ground (black edging) or will have a slightly positive potential. In response to the main or reproduction signals, the circuit 32 couples either a positive potential or a color subcarrier signal to the channel 10. This results in the reproduction of white characters with black or colorized contour enhancement or colored characters with gray contour enhancement.

Although the invention has been described herein with reference to a specific embodiment, many modifications and variations therein will readily occur to those skilled in the art. Accordingly, all such variations and modifications are included within the intended scope of the invention as defined by the following claims.

1. Apparatus for supplying to a television channel title information signals reproducible as title information with predetermined contour enhancement completely surrounding each character in the title comprising:

an image enhancer adapted to respond to title information signals for producing reproductions thereof together with detail signals comprising pulses which occur at times that are a function of the leading, trailing, top, and bottom edges of each reproduced signal;

adjustable delay means for receiving said reproductions and for producing delayed reproductions which are aligned in time with said pulses;

first keyer means responsive to said pulses for supplying a first predetermined signal to the television channel during the duration of each pulse; and second keyer means responsive to said delayed reproductions for supplying a second predetermined signal to the television channel during the duration of each delayed reproduction.

2. Apparatus as defined by claim 1 wherein programmed television signals are supplied to the television channel and wherein the signals supplied to the channel by said first and second keyer means effectively blank out said television program signals during the operation thereof.

3. Apparatus as defined by claim 2 wherein the first keyer means comprises means for supplying alternately a color subcarrier signal having a variable phase and amplitude or a predetermined and variable potential to said television channel and the second keyer means comprises means for supplying alternately a predetermined and variable potential or a color subcarrier signal having a variable phase and amplitude to said television channel during the duration of each delayed reproduction.

4. Apparatus as defined by claim 3 further comprising amplifier means in said television channel having an input terminal coupled to one of the keyer means and an output terminal coupled to the other of said keyer means.

5. Apparatus as defined by claim 4 further comprising restorer circuit means responsive to the programmed television signals for inserting the appropriate black level into said programmed television signals.

6. Apparatus as defined by claim 5 further comprising means for inverting the phase of said detail signals.